United States Patent [19]
Miller, Jr.

[11] Patent Number: 5,632,674
[45] Date of Patent: May 27, 1997

[54] GRAIN BIN WITH SIDE WALLS HAVING INTEGRAL VERTICAL STIFFENERS AND AIR CONDUITS

[75] Inventor: George E. Miller, Jr., Raytown, Mo.

[73] Assignee: Butler Manufacturing Company, Kansas City, Mo.

[21] Appl. No.: 552,081

[22] Filed: Nov. 2, 1995

[51] Int. Cl.⁶ .................................................. E04H 7/22
[52] U.S. Cl. .................. 454/182; 29/897.32; 34/233; 454/175; 454/181
[58] Field of Search .................. 29/897.32; 454/174, 454/175, 181, 182; 34/232, 233

[56] References Cited

U.S. PATENT DOCUMENTS

| | | |
|---|---|---|
| 1,191,863 | 1/1916 | Williams . |
| 1,605,513 | 11/1926 | Connery . |
| 1,977,391 | 10/1934 | Kramer ..................................... 454/182 |
| 1,996,004 | 3/1935 | Fraser . |
| 3,299,598 | 1/1967 | Alleaume . |
| 3,531,874 | 10/1970 | Sukup ............................. 454/182 X |
| 3,608,204 | 9/1971 | Ashby . |
| 4,009,520 | 3/1977 | Sukup ..................................... 454/182 |
| 4,306,490 | 12/1981 | Kallestad et al. ......................... 454/182 |
| 4,319,411 | 3/1982 | Steffen . |
| 4,380,573 | 4/1983 | Naslund . |
| 4,885,985 | 12/1989 | Pollock .................................... 454/182 |

*Primary Examiner*—Harold Joyce
*Attorney, Agent, or Firm*—Kokjer, Kircher, Bowman & Johnson

[57] ABSTRACT

A grain bin structure for storing, conditioning, and drying grain having a floor, side walls, and a roof. The side walls are formed with a plurality of horizontal and vertical corrugations formed integrally therein and within a common circumferential plane. The vertical corrugations function as stiffeners and as vertical air conduits to dispense pressurized air about the periphery of the bin. Optionally, conduit tubes may be located within the vertically disposed corrugations to further channel air flow. These conduits are formed with an inner wall substantially flush with the interior of the horizontal corrugation, thereby maintaining a low silhouette while maximizing a cross-sectional area within each conduit to avoid undue restriction of air flow.

11 Claims, 3 Drawing Sheets

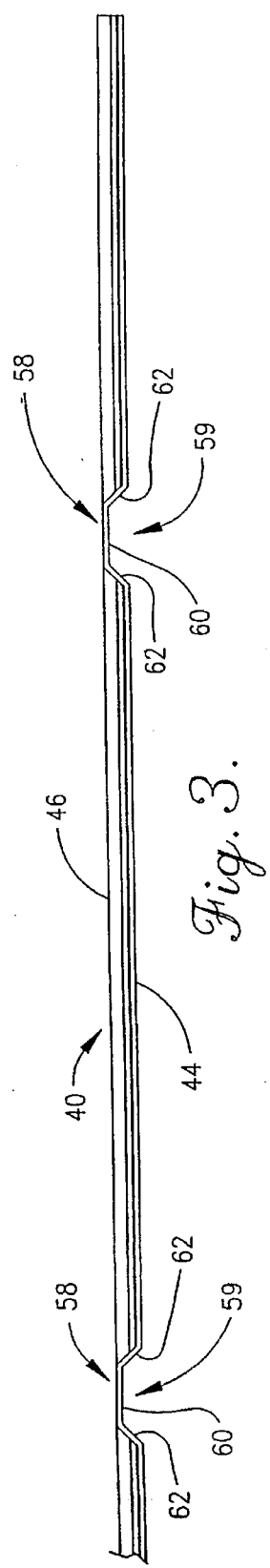
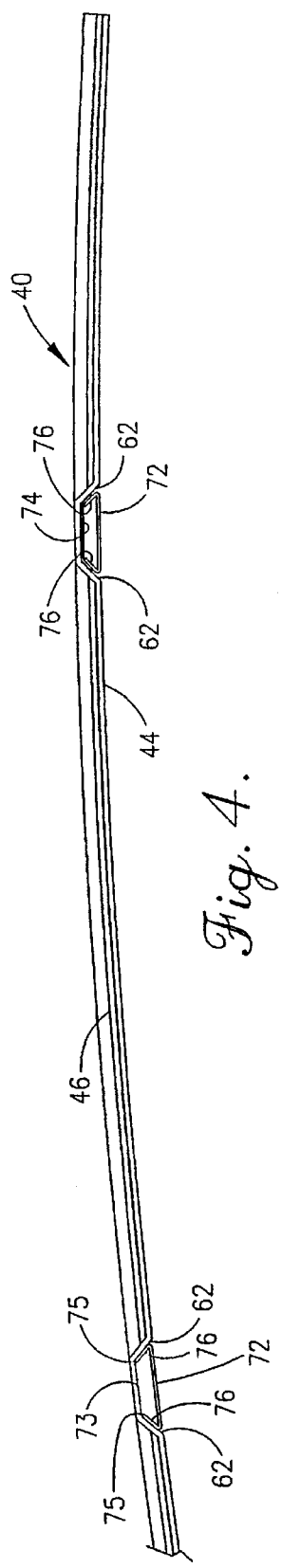
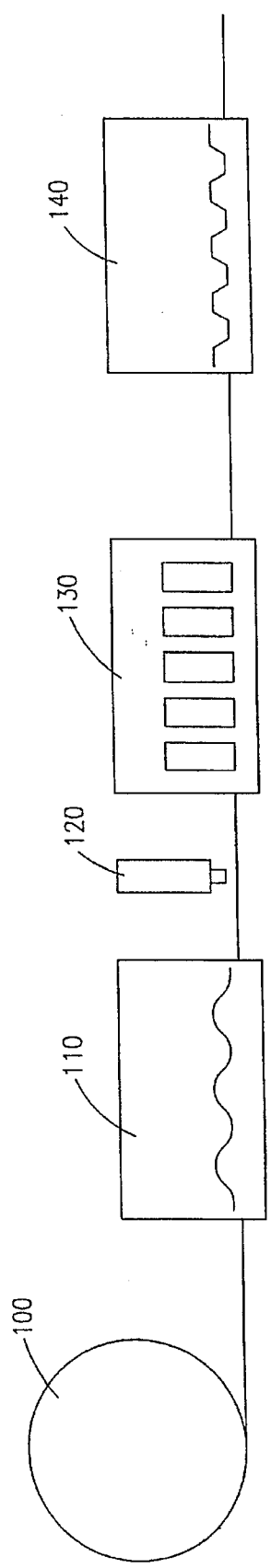

and integral vertical corrugation disclosed page 1 content:

GRAIN BIN WITH SIDE WALLS HAVING INTEGRAL VERTICAL STIFFENERS AND AIR CONDUITS

BACKGROUND OF THE INVENTION

1. Field of the Invention

The present invention is generally related to a grain bin structure, and, more particularly, to a grain bin having side walls containing integral vertical stiffeners which also function as conduits for dispersing air about the interior surface of the bin.

2. Description of the Related Art

In the past, several grain bin structures have been proposed, such as those illustrated in the following U.S. Pat. Nos.: 4,885,985 (Pollock); 4,319,411 (Steffen); 4,009,520 (Sukup); 3,608,204 (Ashby); and 3,531,874 (Sukup).

These conventional grain bins include a tubular side wall structure having a plurality of horizontally aligned corrugations thereabout. The bin rests upon a cement foundation. A raised perforated floor may be built within the bin and supported by vertical columns to form an air pressure chamber below the perforated floor. A blower directs air into the chamber to maintain a desired pressure therein. Pressurized air escapes upward through the perforations and upward through the grain to be discharged through vents located in the bin roof. This air flow process effects grain drying.

The '874 patent to Sukup discloses a device for drying grain which includes a blower heater unit which directs air under the perforated floor of the bin. Additionally, a plurality of physically separate conduits are attached along the inside wall of the bin. The conduits or tubes are disposed vertically to promote air circulation at the periphery of the bin. Each tube is secured to the wall via braces. Multiple holes in each tube allow air to flow therefrom. The '520 patent to Sukup discloses a grain drying system which similarly uses a plurality of physically separate tubes extending vertically along the walls of the bin to direct air flow into the bin. In the '520 Sukup patent, the tubes are formed with a triangular cross-section and include holes along opposite sides thereof to direct the air flow about the perimeter of the bin.

The patent to Pollock discloses a grain bin arrangement which provides air flow to areas along the levels of the grain. Pollock's system includes a plurality of tubes or conduits extending vertically along the walls of the bin, with each conduit having air outlets. In addition, an air float is provided in each tube and slides therealong to direct the air into the grain and prevent the air from traveling along the tubes to a position above the level of the grain. The patent to Steffen discloses a grain bin constructed with aspirating panels about the exterior to admit air to freely flow through the walls of the grain bin. The patent to Ashby discloses a vessel for storing grain which contains a plurality of ribs extending about the exterior of the sphere. The ribs may form conduits and have spaced perforations along the length thereof. The ribs provide air flow along the inner casing of the bin.

However, these conventional grain bin systems have met with limited success. First, the horizontal corrugations hinder air flow upward along the interior surface of the side walls as air attempts to travel vertically along these corrugations. The air is unable to follow the wave-like contour of the corrugations and hence without Sukup's and Pollack's internal conduits, air does not flow through grain stored within the valleys of the corrugations, nor does air flow through the grain immediately adjacent the side wall. The absence of air flow immediately adjacent the side walls causes the grain in these regions to spoil since its moisture content is not reduced through drying. Additionally, often condensation collects upon the interior surface of the bin wall, further exposing the grain to moisture.

While Sukup's and Pollack's systems attempt to address this problem, they do not direct the air into the horizonal corrugations. The air outlet ports in the vertical conduits are displaced radially inward from the horizonal corrugations and as such the conduits do not necessarily direct the air along the corrugations. Instead, air from the vertical conduits is direct into the grain and disbursed proximate the conduit. Thus the conventional vertical conduits have not effectively achieved true air flow along the entire interior perimeter of the bin.

Moreover, these conventional systems have experienced additional problems. For instance, Sukup's and Pollock's vertically disposed conduits are secured to the interior of the bin with brackets. The conduits and brackets are disposed within the interior of the innermost ridges surface of the side wall formed by the innermost peaks of the corrugations. Conventional bins typically utilize an auger assembly located within the bin to stir the grain therein. This auger travels about the circumference of the bin and moves radially inward and outward as it pulls the grain upward to stir the entire perimeter region. Pollock's and Sukup's systems prevent the auger from functioning immediately adjacent the interior surface of the bin. Instead, the auger must be limited to a range of motion which does not interfere with the conduits. Hence, no grain circulation is achieved proximate the side walls and this grain must be exclusively dried through air circulation. Further, quite often the stirring augers accidentally become misaligned and move too far outward and engage the conduits. Thus Pollock's and Sukup's systems are quite sensitive to auger misalignments which typically rip the conduits loose from the bin and result in substantial damage to the overall drying system.

Moreover, conventional grain bins have experienced failures within the integrity of the side walls. These failures occur when the side walls experience undue down loading (i.e., downward forces caused by the grain load and by the weight of the upper portion of the bin, along with the downward forces created by the stirring machinery which continuously lifts grain and induces a downward force upon its support structure located at the top of the bin). When failures occur, typically the corrugations "roll downward" or buckle. To overcome this problem, conventional bins utilize a thick side wall structure formed from a large gauge material. The necessity for thicker side walls increases the bin's overall expense. Pollack's and Sukup's vertical conduits offer little vertical support.

The patent to Kramer proposes a grain bin structure utilizing horizontal and vertical corrugations. However, Kramer's system is unduly complex and expensive to manufacture and provides limited additional structural support.

Finally, within conventional grain bin, each side wall sheet used to form the bin must be manufactured with a specific curve formed therein conforming to the diameter of the bin within which the sheet will be used. Hence, a bin having a 24 foot diameter requires side wall sheets to be formed (or "rolled") with one curve, while a bin having a larger diameter requires sheets to be formed with a second lesser curve. Accordingly, manufacturers and dealers are required to maintain separate inventories of side wall sheets for each size of bin. This practice substantially increased the inventory requirements and was undesirable. In addition, when manufacturing conventional wall sheets, the sheet must be passed through a roller assembly to provide the desired curve therein. The roller manufacturing step increases the manufacturing cost and is also undesirable.

Hence, a need remains within the industry for an improved grain bin with enhanced air flow and structural integrity. It is an object of the present invention to meet these needs.

SUMMARY OF THE INVENTION

It is an object of the present invention to provide a grain bin structure which facilitates air flow immediately adjacent the inner surface of the side walls in the horizontal corrugations of the wall, while avoiding interference with stirring equipment in the bin.

It is a corollary object of the present invention to provide a corrugated wall structure having vertical and horizontal corrugations forming a channel network to disperse air horizontally and vertically about the interior surface of the bin to effect grain drying.

It is a further object of the present invention to provide an integral vertical stiffener configuration within the grain bin side walls to enhance the wall integrity.

It is a corollary object of the present invention to increase the strength of the side walls, thereby significantly reducing the gauge of the material required.

It is another object of the present invention to provide an air flow conduit network about the perimeter of the grain bin which does not interfere with the mixing/stirring equipment located within the bin.

It is a further object of the present invention to provide a side wall sheet arrangement which may be easily manufactured into a substantially flat sheet, but for horizontal and vertical corrugations therein to enable a single type of sheet to be used with any diameter of grain bin.

It is a further object of the present invention to provide a universal side sheet arrangement which may be used with grain bins of varying diameters.

Finally, it is a further object of the present invention to provide a side wall configuration for a grain bin which is produced through a simplified manufacturing process.

These and other objects of the present invention are provided by a grain bin structure for storing and drying grain having a floor, side walls and a roof. The side walls are formed with a plurality of horizontal and vertical corrugations formed integrally therein and within a common circumferential plane. The vertical corrugations function as stiffeners and as vertical air conduits to dispense pressurized air about the periphery of the bin. Optionally, conduit tubes may be located within the vertically disposed corrugations to further channel air flow. These conduits are formed with an inner wall substantially flush with the interior of the horizontal corrugation, thereby maintaining a low silhouette while maximizing a cross-sectional area of each conduit to avoid undue restriction of air flow.

BRIEF DESCRIPTION OF THE DRAWINGS

The objects and features of the invention noted above are explained in more detail with reference to the drawings, in which like reference numerals denote like elements, and in which:

FIG. 3 illustrates a top plan view of a flat side sheet with empty air channels according to the present invention;

FIG. 4 illustrates a top plan view of a side sheet cured to a particular bin size according to the present invention with air conduits with the different channel; and FIG. 5 illustrates a block diagram of a manufacturing process utilized to produce sheets according to the present invention.

DETAILED DESCRIPTION OF THE INVENTION

Figure 1:
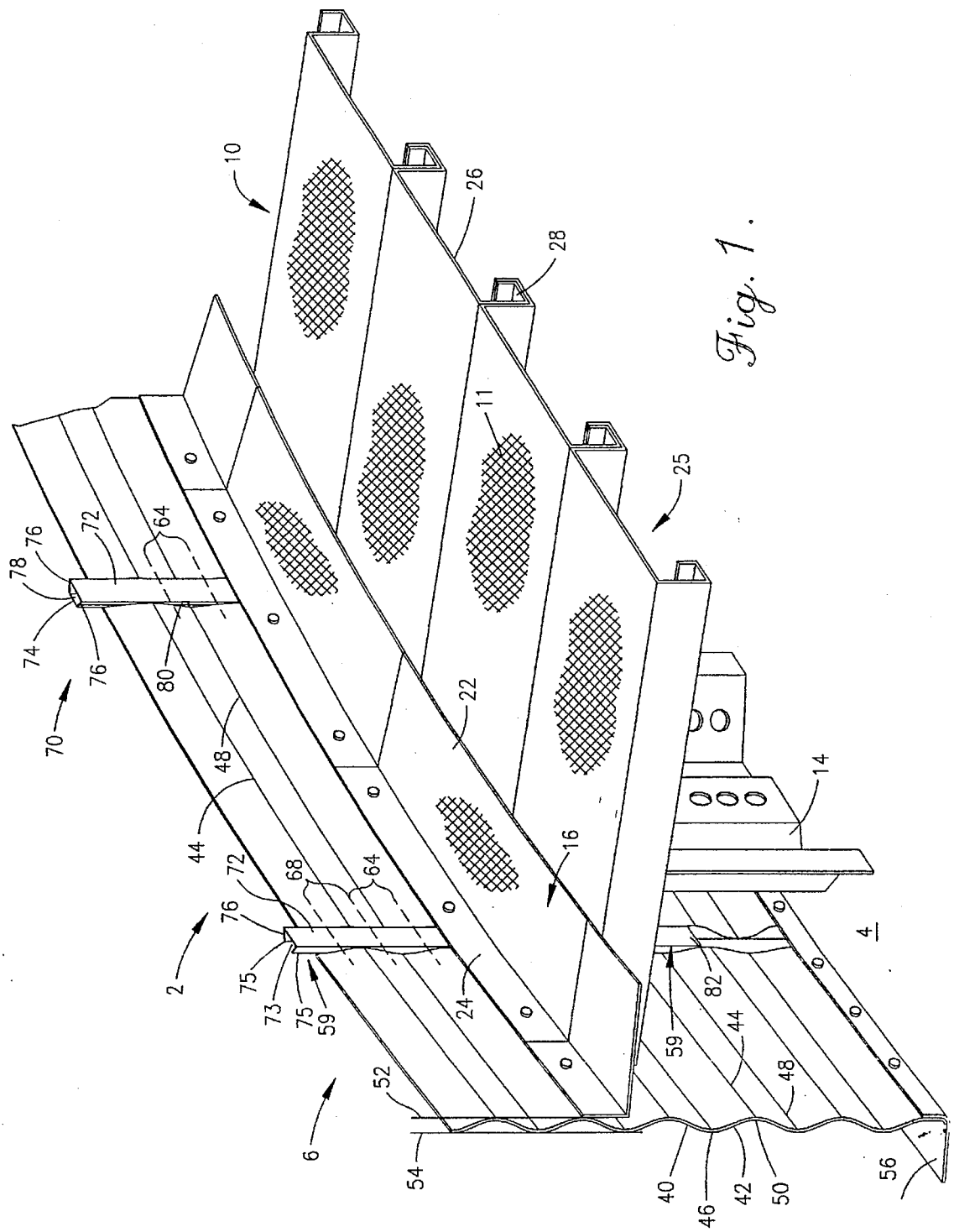
FIG. 1 illustrates a perspective view of an inner portion of the bin side wall proximate the floor according to the present invention.

FIG. 1 generally illustrates an interior portion of a grain bin structure 2 according to the present invention. The grain bin 2 includes side wall 6 mounted upon a foundation 4. A roof (not shown) is supported on the side wall 6 and includes a central opening covered by a lid to receive grains. Within the bin, a raised perforated floor structure 10 is provided vertically above the foundation 4. The floor 10 is supported via a plurality of vertical columns 14 evenly distributed about the interior of the bin. The vertical columns 14 maintain the, floor 10 a predefined distance above the foundation 4, thereby defining a chamber 25 therebetween which retains pressurized air when the blower on the bin is in use. A blower (not shown) located outside the bin is attached via a duct to a hole in the side wall 6. The blower maintains a desired pressure within the chamber 25. Pressurized air escapes from the chamber 25 upward through perforations 11 in the floor 10 at a rate determined by the pressure, grain depth, and type of grain.

The perforated floor 10 may be formed in a conventional manner, such as by combining a plurality of rectangular panels 26 (formed with a known hat shaped cross-section) in a parallel and intersecting combination. Each of the panels 26 includes trough segments 28 extending along opposite sides thereof which overlap with a corresponding trough segments 28 on an adjacent panel 26 to form the continuous floor 10. The vertical columns 14 include a body section having a structurally rigid cross-section, such as a W-shaped cross-section. The columns 14 include hooked fingers on the upper ends thereof which positively engage the troughs 28 to attach the panels 26 to the columns 14. A perforated skirt 16 is provided about the perimeter of the floor 10 and secured to the inside surface of the side wall 6. The skirt 16 includes a base portion 22 which overlaps and is secured to the floor 10. The base 22 is integrally formed with a peripheral flange 24 projecting upward therefrom and aligning flush against the interior surface of the side wall 6. The peripheral flange 24 is secured to the interior of the side wall 6.

The side wall 6 is formed from a plurality of side sheets 40 extending peripherally about the bin and having a plurality of holes 41 (FIG. 2) therethrough proximate the edges. Bolts are used to join overlapping edges of adjacent sheets 40 once the holes 41 are aligned. Sheets 40 join with one another to form multiple stacked rings. The lowermost ring is attached to the foundation 4 via a circular bracket which defines the radius of the bin. Optionally, the sheets 40 utilized to form the lowermost ring of the bin (i.e., the ring secured to the foundation) may be formed with a flared bottom lip 56 defining the curvature of the lowermost ring to facilitate attachment to the foundation 4.

Each sheet 40 is formed with a plurality of horizontal corrugations 42 therein having a smooth continuous wave-shaped cross-section. The corrugations 42 include inner and outer peaks 44 and 46, and inner and outer valleys 48 and 50 about the interior and exterior surfaces of the side wall 6. The inner peaks 44 are aligned with one another to define an innermost circumferential plane (illustrated by line 52) of the side wall 6. Stirring equipment must be aligned to operate within the circumferential plane 52. Similarly, the outer peaks 46 project outward and define an outermost circumferential plane 54 of the side wall 6.

Figure 2:
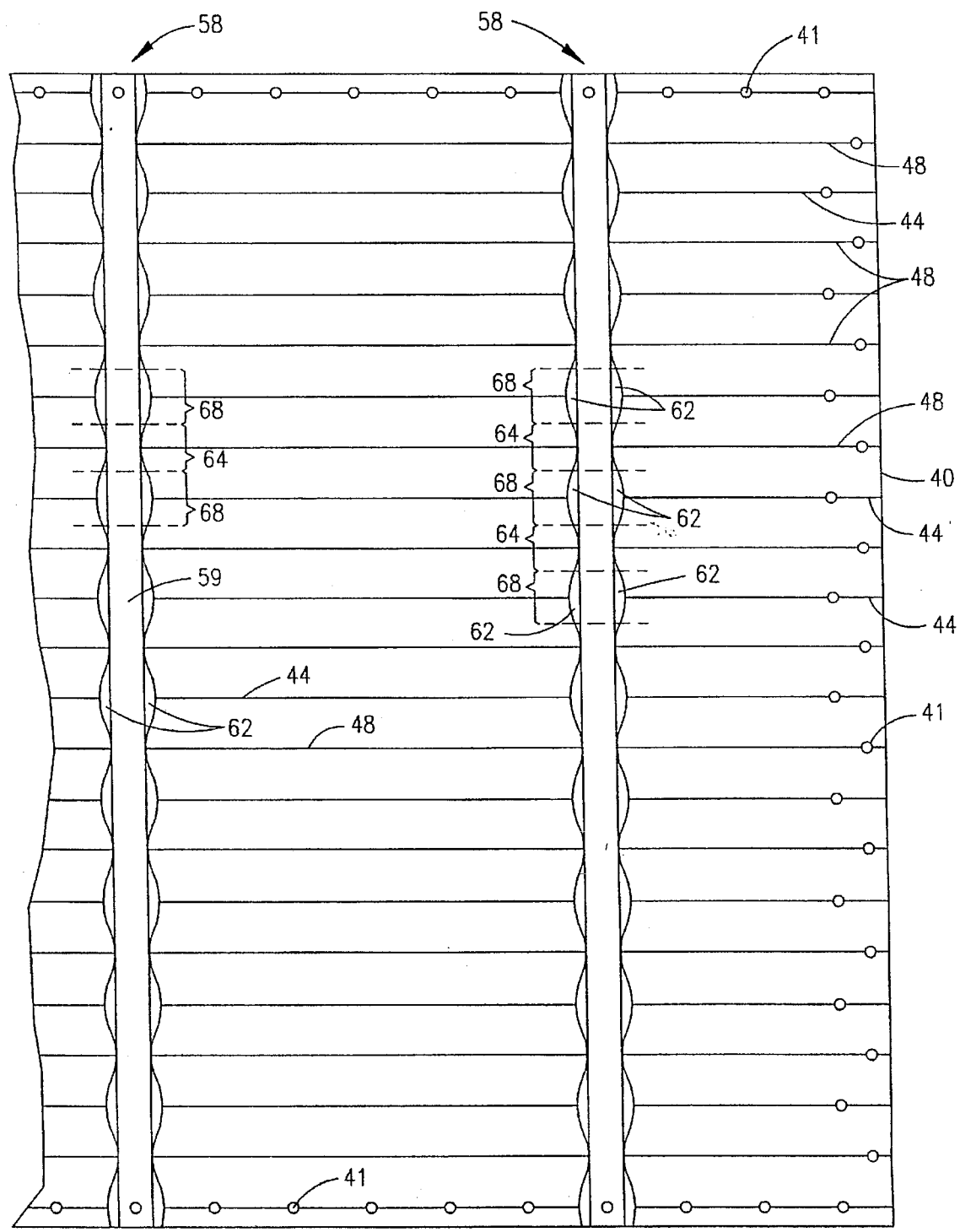
FIG. 2 illustrates a side view of an inner surface of the bin wall.

As shown in FIG. 2, each sheet 40 further includes a plurality of vertically aligned stiffeners 58 traversing the horizontal corrugations 42. The stiffeners 58 are formed integrally within the sheet 40 and, on the interior of the bin, to define an interior channel 59 (FIG. 3) extending upward or vertically along the interior of the sheet 40. The channel 59 (FIG. 3) is concave toward the interior of the bin. Each stiffener 58 includes a base section 60 which is substantially planar and extends upward along a tangential plane parallel to the inner and outer circumferential planes 52 and 54. The base section 60 includes an outer surface aligned substantially flush with the outermost circumferential plane 54 defined by the outer peaks 46.

The base section 60 is dissected (by shadow lines in FIG. 2) along its vertical length into distribution segments 64 and transfer segments 68. The distribution segments 64 are regions of the section 60 aligned with the inner valleys 48 projecting about the periphery of each inner valley 48 of the corrugations 42. The transfer segments 68 are located between distribution segments 64 and form a discontinuity in the inner peaks 44 of the corrugations 42. Each transfer segment 68 is joined integrally with opposed beveled flanges 62 projecting radially inward therefrom and flared peripherally toward the corresponding inner peak 46 of the corrugation 42. The transfer segments 68 transfer air vertically along the side wall 6 without interference from the corrugations 42. The channels 59 and inner valleys 48 combine to form a conduit network, both vertically and horizontally, about the inner periphery of the side walls 6.

Return to FIG. 1, each channel 59 includes a lower end which extends below the skirt 16 to the foundation 4. The skirt 16 and floor 10 do not interfere with the channels 59. Pressurized air within the chamber 25 is driven vertically along the channels 59 to the roof of the bin. As the air flows vertically along the channels 59, it is distributed horizontally at the distribution segments 64 into the inner valleys 48 of each corrugation 42. Hence, pressurized air travels vertically and horizontally along the entire inner periphery of the side wall 6 to the dry grain proximate thereto.

FIGS. 1 and 4 illustrate an alternative embodiment wherein conduits 70 are securely mounted within each of the channels 59. The conduits 70 may be formed with inner and outer faces 72 and 74 joined via flared side segments 76 to form a trapezoidally shaped cross-section surrounding an internal passageway 78. The inner faces 72 are aligned substantially flush with the inner circumferential plane 52. The side segments 76 are arranged to engage evenly the flanges 62 in a facing relation when the side sheet 40 is curved to the desired arc based on the diameter of the bin. A plurality of vent holes 80 are provided along opposite sides of the conduit 70 proximate the intersecting edges between the inner face 72 and the flared side segments 76. The vent holes 80 are aligned with the distribution segments 64 and the inner valleys 48 of the corrugations 42. The conduit 70 includes an open lower end 82 located below the floor 10 within the chamber 25 to receive pressurized air.

Optionally, the conduit 70 may be formed with an open outer face as shown at point 73 in FIGS. 1 and 4. In this alternative embodiment, the conduit 70 merely includes an inner face 72 and side segments 76. The base section 60 of the channel 59 abuts against the outer edges 75 of the side segments 76 to form the outer wall of the passageway 78.

During a drying operation, the blower injects air into the chamber 25 to maintain a desired pressure. Pressurized air escapes upward through the perforated floor 10 and travels upward through the grain. Pressurized air similarly enters the conduit 70 through its open lower end and travels upward along its internal passageway 78. As the pressurized air travels along the passageway 78, it is vented outward through the holes 80 laterally into the valleys 48. The pressurized air travels along the valleys 48 to dry grain proximate the wall. In this manner, the inventive channel and conduit arrangement facilitates air flow immediately adjacent the side walls and within the valleys of the corrugations. The inventive arrangement enhances the air flow and reduces spoilage of the grain.

Moreover, the inventive stiffener arrangement within the plane of the side wall significantly enhances the structural integrity of the side wall while avoiding interference with stirring equipment located within the bin. In the alternative embodiment, which utilizes the conduit 70, the inner face 72 of the conduit 70 is substantially flush with the inner peaks 46 of the corrugations 42. Accordingly, even when the conduit 70 is included, the inventive system avoids interference with the stirring mechanism and allows the stirring auger to run substantially adjacent to the interior periphery of the bin.

By significantly enhancing the structural integrity of the bin walls, a significantly thinner sheet material may be utilized. For example, the inventive stiffener arrangement has proven to enhance the bin's vertical load carrying strength by approximately 60%. Accordingly, a substantially smaller gauge material may be used while affording the same or better vertical structural integrity as compared to conventional bin configurations.

Further, the inventive stiffener configuration simplifies manufacturing. Specifically, it eliminates the need to roll each side wall sheet during manufacturing to form a predefined curve therein. In conventional bins, the side wall sheets are curved to an arc corresponding to the diameter of a particular size bin within which the sheet is used. Instead, the inventive system enables the side wall sheets to remain as substantially planar sheets when manufactured. Once the stiffeners are formed within the corrugated flat sheets, the sheets are easily manually bent at the time they are bolted to the bin. In more detail, a substantially planar sheet may be attached at one end to the circular bracket 12 (on the foundation) and folded by the installation personnel along the circular bracket 12. The stiffeners 58 enable each sheet to be folded manually at each of the stiffener edges to the desired curvature. Accordingly, individual sheets need not be pre-rolled to a defined curve, but instead remain substantially flat until installed. Also, one side sheet may be universally used with all bin sizes since it may be manually bent to any necessary curve.

FIG. 5 illustrates in block diagram form a manufacturing process utilized to produce sheets according to the present invention. According to this process, a roll of continuous sheet material 100 is provided at an input and the sheet 100 is continuously delivered to a grooving machine 110 having a plurality of rollers which forms the horizontal grooves in the sheet material. The grooved sheet is discharged from the corrugation machine 110 and delivered to a cutter 120 which cuts the continuous sheet spool into sections having a desired length. Thereafter, each section is delivered to a punch 130 which punches a predefined bolt pattern in the sheet to be utilized to attach sheets to form a bin. Next, each sheet is delivered to a stamping machine 140 which stamps a desired number of stiffeners 58 in each sheet. The stamping apparatus 140 includes a plurality of stamping bars aligned transverse to the longitude of the sheet and spaced apart from one another. Each stamping bar includes an exterior contour substantially corresponding to the interior contour of the channel 59. Once the sheet is in place, the stamping apparatus drives each of the stamping bars downward against the sheet to simultaneously stamp the desired number of stiffeners into the sheet. Thereafter, the sheet is delivered to a stock pile. During this process, the sheet need not be rolled into a predefined curve since the stiffeners allow each sheet to be flexed when being installed to a desired curve.

The foregoing method removes the curve rolling step and enables a single sheet to be used in a bin sizes, thereby reducing the inventory requirements and reducing the manufacturing cost.

Optionally, each stiffener may be provided with a differing cross-section, so long as the foregoing objectives are achieved. Similarly, the conduit 70 may be modified in cross-section depending upon the cross-section of the stiffeners 58 provided the conduit 70 maintains sufficient cross-sectional area to afford adequate air flow therethrough.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In a grain bin for storing and drying grain, having a floor, a roof, and a bin side wall extending therebetween, said improvement comprising:

a bin side wall containing a plurality of horizontally arranged corrugations extending about a circumference of the bin, said horizontal corrugations defining inner and outer circumferential planes of said wall, said side wall further containing a plurality of vertically extending stiffeners integrally formed therein, said stiffeners each containing a vertically recessed channel which traverses said horizonal corrugations to form passageways upward along said side wall between said inner and outer circumferential planes.

2. In a grain bin according to claim 1, further comprising at least one hollow conduit received in a corresponding passageway, for guiding air vertically along said side wall, said conduit including perforations therein to discharge the air at desired points along said side wall, said conduit having an interior face aligning substantially flush with said inner circumferential plane of said side wall.

3. In a grain bin according to claim 1, wherein each of said stiffeners includes a recessed vertical base section and flared side flanges projecting from opposite edges of said base section toward an interior of the bin, said base section and side flanges being located between said inner and outer circumferential planes of said side wall.

4. In a grain bin according to claim 2, wherein said conduit if formed with a polyhedral cross-section, a center of which is located between the inner and outer circumferential planes of said side wall.

5. In a grain bin according to claim 2, wherein said conduit is formed with a trapezoidally shaped cross-section.

6. In a grain bin according to claim 2, wherein said conduit includes side segments aligned in a facing relation with corresponding opposed flared flanges of said passage, said perforations aligning with corresponding valleys of said side wall.

7. In a grain bid according to claim 1, wherein said recessed channel includes a base section extending along a plane parallel to, and between said inner and outer circumferential planes, integral opposed beveled flanges projection radially inward from said base section.

8. In a grain bin according to claim 1, wherein said recessed channel includes side flanges formed integral with said corrugations, said flanges extending between said inner and outer circumferential planes.

9. In a grain bin according to claim 1, wherein said recessed channel includes alternative distribution and transfer segments aligned in a common plane said distribution segments aligning with inner valleys of said horizonal corrugations, said transfer segments projecting vertically through and interrupting, inner peaks of said horizontal corrugations.

10. A method of forming a side sheet for a grain bin, comprising the steps of:

forming corrugations in a side sheet extending along a longitudinal axis of said side sheet; and forming stiffeners in said side sheet, said stiffeners aligned laterally to said axis, said stiffeners being formed between inner and outer circumferential planes defined by inner and outer peaks of said corrugations, said stiffener forming step including pressing a recessed passage in said side sheet, said passage containing distribution segments aligned flush with inner valleys of said corrugations and containing transfer segments traversing, and forming notches in, inner peaks of said side wall.

11. A method of forming a side sheet for a grain bin, comprising the steps of:

forming corrugations in a side sheet extending parallel to a longitudinal axis of said side sheet;

forming stiffeners in said side sheet, said stiffeners aligned laterally to said axis, said stiffeners being formed between inner and outer circumferential planes defined by inner and outer peaks of said corrugations;

said stiffener forming step including pressing a lateral recessed channel in an inner side of said sheet, said recessed channel containing a base section traversing said corrugations; and securing a conduit within the recessed channel formed by said stiffeners and aligning an inner face of said conduit substantially flush with inner peaks of said corrugations.

* * * * *